United States Patent [19]

Salamone

[11] 4,084,645

[45] Apr. 18, 1978

[54] APPARATUS FOR SECURING T-EDGING AND SIMILAR EDGING BANDS

[75] Inventor: Saverio Salamone, Sun City, Ariz.

[73] Assignee: Evans Rotork, Inc., Glendale, Ariz.

[21] Appl. No.: 748,824

[22] Filed: Dec. 9, 1976

[51] Int. Cl.[2] .......... B23Q 5/027

[52] U.S. Cl. .......... 173/13; 173/46; 173/94; 173/131; 173/133; 173/139; 173/DIG. 2

[58] Field of Search .......... 29/254, 564, 564.1, 29/564.2, 564.7; 52/749; 81/52.3, 52.35; 173/13, 46, 93–100, 122, 123, 128, 131, 133, 139, DIG. 2

[56] References Cited

U.S. PATENT DOCUMENTS

| | | | |
|---|---|---|---|
| 237,818 | 2/1881 | Chevalier | 173/100 |
| 389,524 | 9/1888 | Michales | 173/97 X |
| 776,566 | 12/1904 | Thomas | 173/100 |
| 1,094,664 | 4/1914 | Leonardi | 173/94 |
| 1,778,547 | 10/1930 | Brown | 173/100 |
| 2,099,246 | 11/1937 | Raffles | 173/131 X |
| 2,500,402 | 3/1950 | Craig | 173/133 X |
| 2,778,355 | 1/1957 | Bourdon | 173/133 X |
| 2,880,715 | 4/1959 | Midkiff et al. | 173/131 |
| 3,513,521 | 5/1970 | Fritz | 29/564.2 |
| 3,757,875 | 9/1973 | Gunning | 173/46 X |

FOREIGN PATENT DOCUMENTS

| | | | |
|---|---|---|---|
| 379,433 | 8/1964 | Switzerland | 173/DIG. 2 |

*Primary Examiner*—Lawrence J. Staab
*Attorney, Agent, or Firm*—Edward J. DaRin

[57] ABSTRACT

A relatively quiet-operating rotary hammer for use in apparatus for securing T-edging and similar edging bands. The hammer includes a pivoted hammer head that is intermittently and continuously impacted to provide a hammering action. The hammer is impacted by a rotary structure carrying spaced hammering elements for forcibly pivoting the hammer head.

17 Claims, 7 Drawing Figures

APPARATUS FOR SECURING T-EDGING AND SIMILAR EDGING BANDS

Prior Art and Summary of the Invention

This invention relates to apparatus for securing T-edging and similar edging bands and more particularly to an improved substantially noise-free hammer for use in such apparatus.

Apparatus for securing T-edging and similar edging bands is known in the art and one such machine particularly adapted for securing T-edging is disclosed in U.S. Pat. No. 3,513,521. In the aforementioned patent, the hammer utilized for the machine comprises an annular hammer that is controlled to be reciprocated for hammering a workpiece or securing a T-edging along the edge of a workpiece. Other types of hammers employed in similar apparatus utilize a vibrating hammer head. The types of hammers presently commercially available for such apparatus have been found to be very noisy and readily lead to operator fatigue. With the ever increasing demand for employee safety and for pleasant working conditions, there is a commercial need to provide quieter apparatus for securing T-edging and similar edging bands. Since the principal cause of noise produced by such apparatus is the hammer acting against a workpiece for securing the edging material, there is a need for an improved and quieter operating hammer for use in apparatus for assembling and securing T-edging and similar edging bands.

The present invention provides an improved apparatus for securing T-edging and similar edging bands that includes an operating hammer that is relatively noise free thereby leading to a substantial reduction in operator fatigue and error and thereby resulting in relatively high production. The improved hammer also has a relatively long life. The hammer of the present invention, when employed in such T-edging securing apparatus, should be acceptable under present day government safety and health regulations, such as the OSHA regulations governing suitable working conditions. The hammer of the present invention is also constructed and defined so that it may be readily substituted for the hammers that are presently incorporated into the apparatus that are in the field without any major changes or major cost disadvantages to thereby render the apparatus in use in compliance with the federal government regulations.

From a structural standpoint, the hammer used in the apparatus for securing T-edging and similar edging bands comprises a rigid flapper element constructed to have a substantially semicircular cross-sectional configuration and being pivotal about a point adjacent one end thereof. The flapper element includes a hard, long-wearing yet resilient impact area defined on a preselected section of the flapper element for receiving and producing the desired hammering action upon being impacted. The hammer includes means for continuously producing an intermittent impacting force on the flapper element upon the flapper element being pivoted into engagement with it. The flapper element is pivotably engageable with the means for producing the impacting force only at the impact area and is swingably responsive to the impacts while being maintained in engagement with the impact producing means by a workpiece for producing a cushioned hammering of the workpiece. The entire hammer unit may be enclosed within a sound insulated cover for further reducing any noise produced by the hammering action.

In one particular embodiment of the invention, the hammer striking area provided for the flapper element is constructed of a hard elastomeric material exhibiting a memory upon being successive impacted.

These and other features of the present invention may be more fully appreciated when considered in the light of the following specification and drawings in which.

Figure 1:
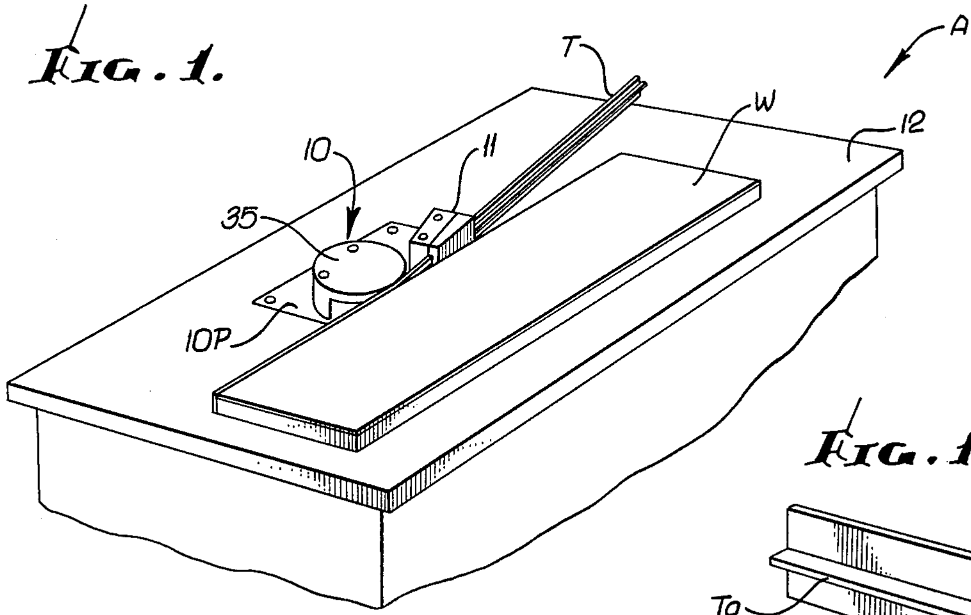
FIG. 1 is a partial perspective view of the apparatus for installing T-edging member arranged in an operative relationship with the hammer for the apparatus and embodying the present invention.
Figure 1A:
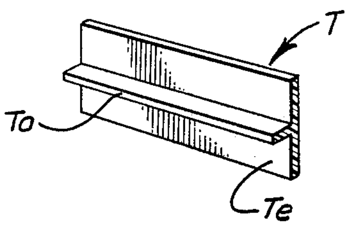
FIG. 1A is a partial, front elevational view of a piece of the T-edging member of FIG. 1 illustrating its tongue and an edging band for insertion in a preformed slot of a workpiece.

Now referring to the drawings, the improved apparatus for securing T-edging and similar edging bands will be described in detail. The general type of apparatus for securing T-edging and similar edging bands under consideration is the type described in the aforementioned U.S. Pat. No. 3,513,521. This type of apparatus will be described as it may be employed for securing a T-edging strip T having an upstanding tongue To attached to an edging band or crosspiece Te as illustrated in FIG. 1A. The general operation of the T-edging securing apparatus A is the same as disclosed in the aforementioned patent and reference may be had to this patent for a detailed description thereof. Only the details of the hammer 10 of the present invention for incorporation in the apparatus A will be described in detail in order to simplify the description of the invention. The apparatus A is illustrated in FIG. 1 with a workpiece W positioned on the top thereof adjacent the hammer 10 and with a T-edging strip T arranged between the workpiece W and the hammer 10 so that it may be secured to the workpiece upon operation of the hammer. It should be recognized that although the invention will be described with regard to the type of T-edging having the configuration illustrated in FIG. 1A and may be a machine cut plastic, that other similar edging bands known in the art, such as plastic or aluminum extrusions having the same general configuration may also be secured to a workpiece by the type of apparatus described.

The hammer 10 is illustrated in FIG. 1 mounted on the flat top of the apparatus A in the normal position occupied by the hammer 310 for the apparatus disclosed in U.S. Pat. No. 3,513,521. The hammer 10 is illustrated mounted adjacent the conventional T-edging guiding and cutting structure 11 and is normally associated with the slotting head mechanism (not shown). The slotting head mechanism is normally provided for producing the slot along the edge of the workpiece W and which piece W is shown as being preslotted in FIG. 1. The slotting head mechanism is identified by the reference numeral 30 in said U.S. Pat. 3,513,521. The guiding and cutting structure 11 is utilized to feed and guide the strip T between the workpiece W and the hammer 10 to allow the T-edging strip to be secured into the slot of the workpiece W by hammering the tongue To into the slot; see FIG. 4. It may also be employed for cutting the strip T. The hammer 10 of the present invention is readily mounted at the conventional location for the hammer in the machines presently commercially available and in use by means of a base plate 10P secured to the top 12 of the apparatus A. The base 10P is readily secured to the opening in the top 12 normally provided for apparatus A for securing the prior art type of hammer and which plate is removable and thereby allows the hammer 10 of the present invention to be readily substituted for the prior art types of hammers in a conventional machine, as should be evident from examining FIG. 1 in the aforementioned U.S. patent.

Figure 4:
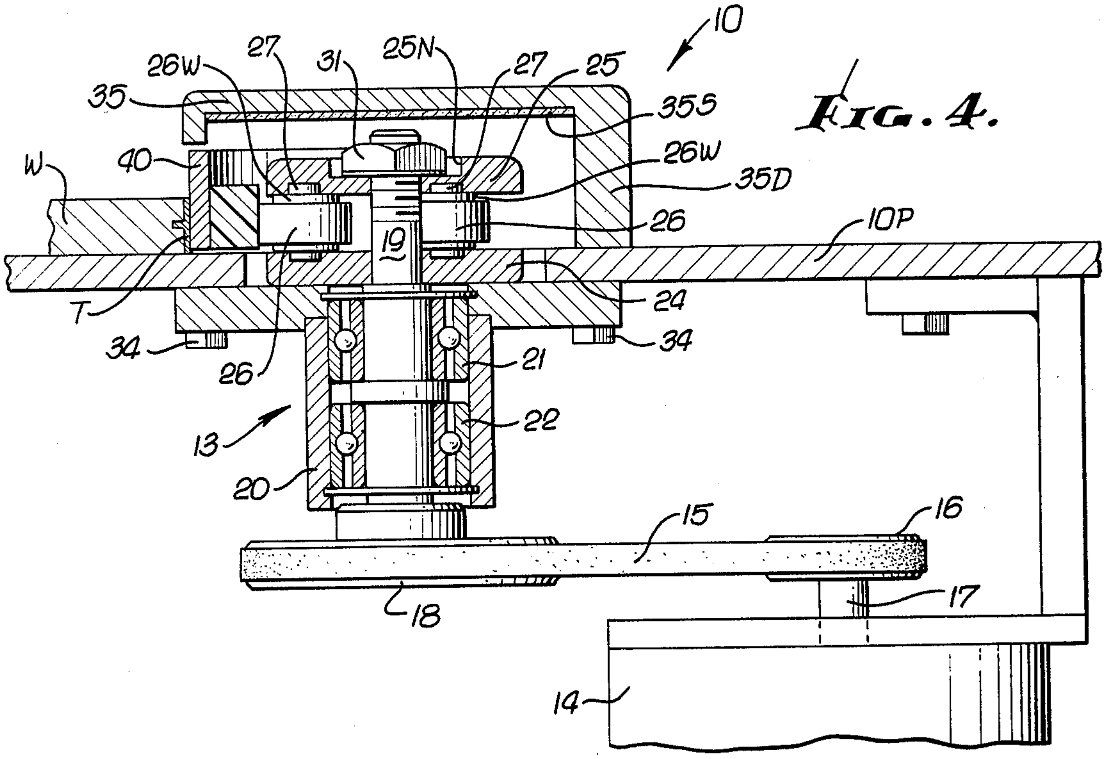
FIG. 4 is a partial, sectional view of the hammer taken along the line 4—4 of FIG. 3.

The hammer structure 10 is mounted on the top 12 of apparatus A so as to be driven by a jack shaft assembly 13 as best illustrated in FIG. 4. The jack shaft assembly 13 mounts the hammer 10 and is actuated thereby in response to the actuation of a motor 14. The motor 14 is coupled to drive the jack shaft assembly 13 by means of a belt 15 coupled therebetween. The belt 15 couples a pulley 16 mounted at the end of the motor drive shaft 17 with a pulley 18 mounted in horizontal alignment with the pulley 16 and coupled to drive the jack shaft 19 of the assembly 13. The pulley 18 is mounted to the opposite end of the jack shaft 19 from the hammer 10 as is evident from examining FIG. 4. The jack shaft 19 extends above the base plate 10P of the apparatus for mounting the hammer 10. The jack shaft 19 is secured in the jack shaft assembly 13 by means of a housing 20 extending below the plate 10P of the apparatus A. The jack shaft housing assembly 13 includes a pair of vertically aligned bearings 21 and 22 secured thereto and enclosed by means of the housing 20. The lower end of the jack shaft assembly 13 mounts the pulley 18 below the bearing 22 for driving the shaft 19. In this instance the relative diameters of the pulleys 16 and 18 are preselected to provide a speed reduction with respect to the normal operating speed of the motor 14. The motor is nominally driven at a speed of 1100 RPM. The speed of the jack shaft 19 is stepped down to provide the proper rotary speed to allow the hammer 10 to properly impact a workpiece W.

The shaft 19 mounts the hammer actuating structure comprising a pair of circular plates 24 and 25 secured to the shaft 19 in a spaced apart relationship and mounting a plurality of bearings 26 therebetween. The bearings 26 function as hammer striking elements. The bearings 26 are rotatably mounted to the plates 25 and 26 by individual stub shafts or pins 27 along with washers 26W. This arrangement allows the bearings 26 to be rotatable with respect to the mounting plates 24 and 25, as may be appreciated from examining FIGS. 4 to 6. As illustrated, the bearings 26 are mounted adjacent the peripheral edges of the circular plates 24 and 25 and extend a preselected distance outwardly from the peripheral edges of the plates to allow them to function as hammer striking elements in response to the rotation of the shaft 19. The bearings 26 are arranged in a spaced apart relationship and in this instance three such bearings 26 are illustrated arranged in a triangular relationship. To positively secure the assembly of the mounting plates 24 and 25 and the bearings 26 to the jack shaft 19, the jack shaft is provided with a key 30 that is secured into the keyway 19K provided for the shaft 19 as best illustrated in FIG. 6. The free end 19T of the shaft 19 is threaded to receive a jam nut 13 for securing the plates 24 and 25 to the shaft 19. For this purpose, the jam nut 31 is threaded onto the end 19T of the shaft 19 and is secured in the aperture 25N provided on the top surface of the mounting plate 25 by means of a washer 32 and a set screw 33. In this fashion, the assembly of plates 24 and 25 and bearings 26 are rigidly coupled to the shaft 19 to be rotatable therewith. The entire jack shaft assembly 13 may then be secured to the bottom side of the base plate 10P by means of fasteners 34.

The upper portion of the jack shaft assembly 13 is enclosed through the provision of a hammer cover 35. The cover 35 overlies the hammer assembly 10 and includes a dependent portion 35D for enclosing the back side of the hammer structure 10; see FIG. 4. To render the hammer 10 quiet-operating, the inside surface of the cover 35 is provided with a sound insulating or absorbent material 35S leading to substantial reduction in any noise audible to the machine operation. The cover 35 is secured to the base plate 10P by means of elongated fasteners 36 in suitable apertures provided in the plate 10P.

Figure 2:
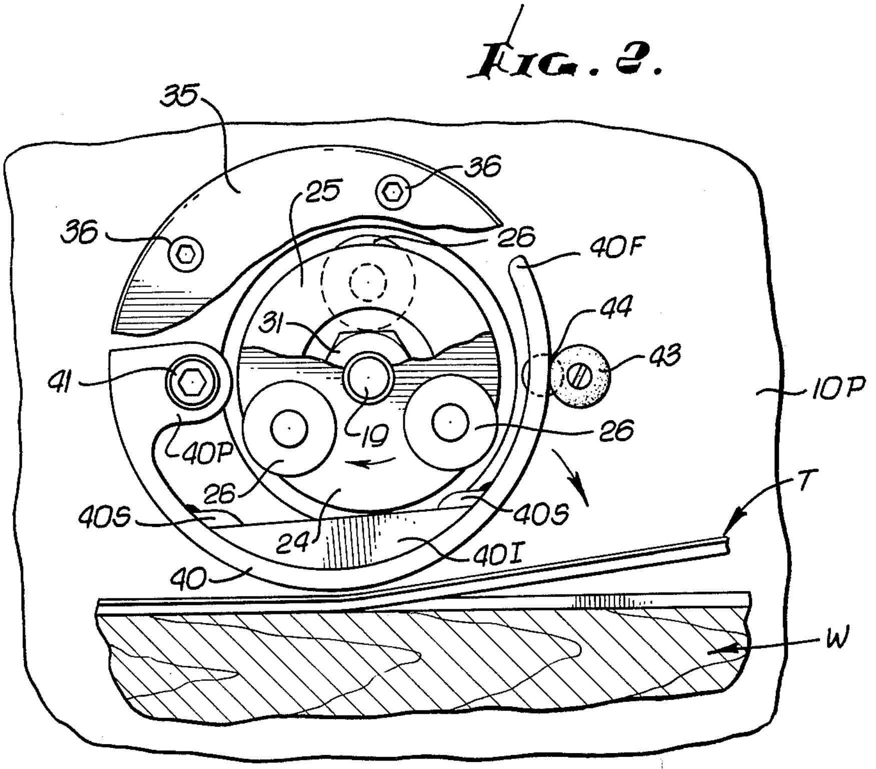
FIG. 2 is a partial, top view of the arrangement of the hammer and the workpiece as illustrated in FIG. 1, with parts broken away and the workpiece and T-edging member arranged in a spaced relationship with the hammer.

The flapper or hammer head 40, the remaining element of the hammer structure 10, is mounted on the plate 10P adjacent the above-described hammer actuating structure. The flapper or hammer head 40 is illustrated as being constructed and defined as having a substantially semicircular cross-sectional configuration that is mounted for surrounding and enclosing the hammer actuating assembly. The hammer head 40 is pivotably mounted adjacent its end 40P by means of the bolt 41 that secures it for swinging movement along the top surface of the base plate 10P. In its normal, non-hammering position, the hammer head 40 is mounted in spaced relationship with the hammer actuating structure and in particular the peripheral edges of the hammer striking elements or bearings 26; see FIG. 2. In this relationship, then, upon rotation of the jack shaft 19 and the hammer striking elements 26 therewith, the hammer or flapper element 40 is not actuated. The hammer 40, however, is pivotally mounted to allow it to be moved into engagement with the hammer striking elements 26 to produce the desired hammering action on a workpiece. The hammer 40 is moved into engagement with the hammer actuating structure by causing the workpiece W and the T-edging strip T to forcibly move the hammer head 40 inwardly. The pressurized relationship between the hammer or flapper 40 and the workpiece cause the interengagement of the hammer striking elements 26 and the adjacent edge of the edging strip T to provide the desired hammering action on the strip T for securing it to the workpiece W.

Figure 3:
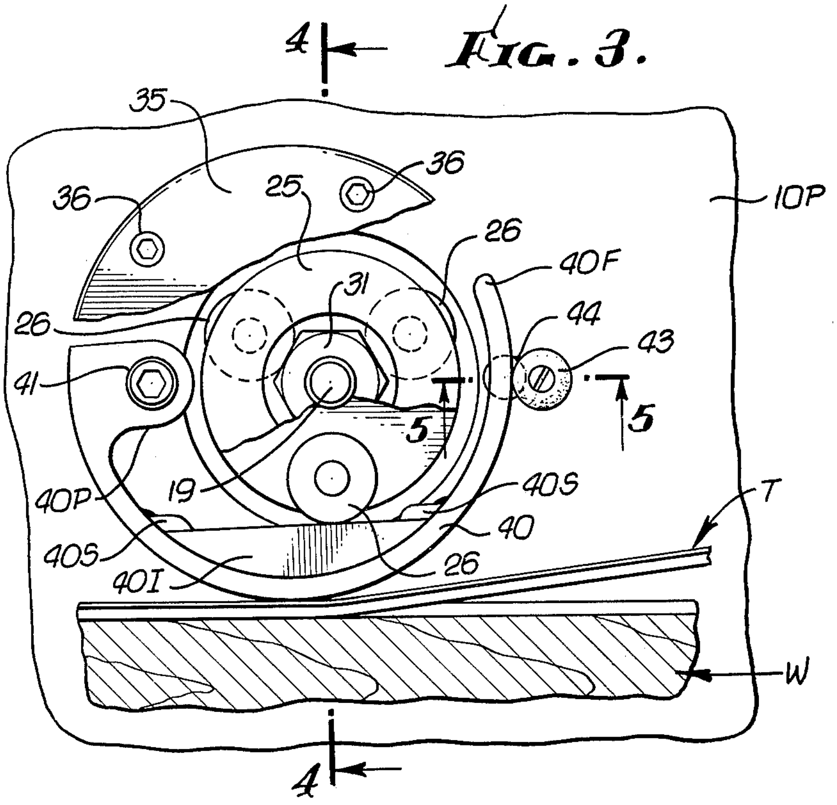
FIG. 3 is a partial top view of the hammer and the workpiece as illustrated in FIG. 1, with portions broken away as illustrated in FIG. 2, but with portions broken away as illustrated in FIG. 2, but with the workpiece, T-edging member and flapper element arranged in engagement with one another.

In order to provide a noise-free hammering operation and yet produce the desired hammering force, the hammer 40 is constructed and defined with an impact area 40I on the inside surface thereof or the surface immediately adjacent the hammer actuating structure. The impact area 40I is preferably constructed from a hard, yet resilient material that exhibits a long-operating life. The hard resilient plastics such as the elastomers which exhibit a memory have been found to be satisfactory for such an application. The impact area 40I, when defined in terms of an elastomer, is shaped to conform to the arcuate surface of the hammer 40 and with a planar impacting surface on the opposite side thereof. This impact element is secured to the inside surface of the hammer 40 by means of a pair of securing elements 40S welded to the inside surface of the hammer 40 for holding the impact element 40I to the hammer. In this relationship, as best illustrated in FIG. 3, it will be noted that the hammer striking elements or bearings 26 will impact the element 40I at a preselected location and cause it to be pivotally driven against a workpiece, such as the strip T so as to drive the tongue To into the slot provided for the workpiece W for securing the two together with the edging Te covering the edge of the workpiece W. It will be appreciated that with the continued rotation of the shaft 19, the hammer striking elements 26 will be continuously and successively driven into engagement with the impact element 40I for pivotally hammering the strip T into engagement with the tongue To. With the continued application of a force to the workpiece W, the hammer 40 will be moved back into position between impacts by the bearings 26 to be struck by the next successive bearing element 26 that is rotated into engagement with the element 40I to cause the strip T to be continuously and intermittently hammered. The selection of the hard yet resilient elastomer for the impact element 40I allows the hammer 40 to operate in a substantially noise free manner and thereby substantially reduce the noise made by most of the prior art type hammers.

Figure 5:
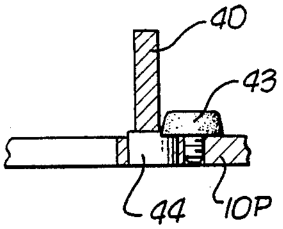
FIG. 5 is a partial, sectional view taken along the line 5—5 of FIG. 3.
Figure 6:
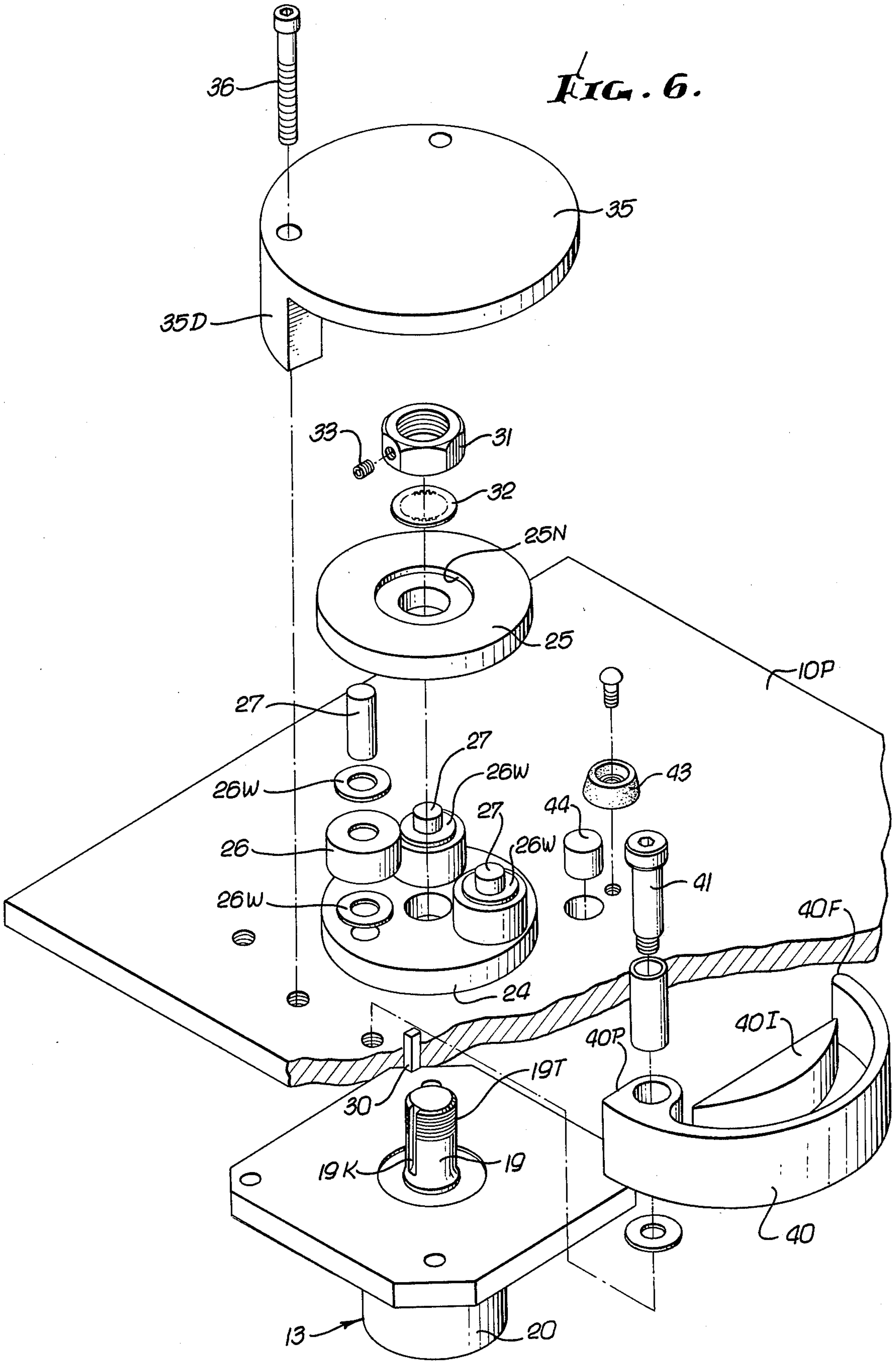
FIG. 6 is an exploded view of the hammer of FIG. 1 with portions broken away.

The free end of the hammer 40, or the end 40F, is guided into position during its pivotal movement towards and away from the hammer actuating structure by means of a bumper 43 secure to the plate 10P adjacent the hammer actuating structure as best viewed in FIG. 5. The bumper 43 may be constructed of a hard yet resilient material such as rubber for receiving the impacts from the free end 40F of the hammer head 40. To reduce the wear on the plate 10P of the apparatus, a wear piece 44 which is illustrated in a circular configuration is also secured adjacent the bumper 43 inwardly thereof to allow the bottom surface of the end 40I for the hammer 40 to ride back and forth over it. The wear piece 44 may be constructed of a hard plastic material which has a long life when subjected to the continuous sliding action of the hammer 40.

With the above structure in mind, the general operation of the hammer 10 of the present invention should be appreciated. At this point, it should be noted that the rotational speed of the shaft 19, the semicircular configuration for the hammer 40 and the arrangement of the bearing striking elements 26 relative to the impact element 40I for the hammer 40, have all been selected and defined relative to one another to provide the desired quiet free hammer action on a workpiece. The positioning of the impact element 40I relative to the striking element 26 and the particular point of impact thereon are important considerations for producing the desired noise-free operation for the hammer structure 10. With the energization of the motor 14, the jack shaft 19 is rotated at the correct speed for rotating the hammer actuating structure therewith. During the intervals that the hammer 40 is maintained in its normal non-hammering position, the hammer actuating structure merely rotates past the hammer 40. When a workpiece is positioned to engage the outer surface of the hammer 40, it will be pivoted inwardly. In this arrangement of the hammer actuating structure and the hammer 40 and with the continuous rotation of the hammer actuating structure, a hammer striking element 26 is rotated into engagement with the impact element 40I. A hammer striking element 26 will impact the element 40I to forcibly drive the hammer head 40 away and into hammering engagement with the T-edging T to hammer it into the workpiece W. The hammer striking element 26 is rotated out of engagement with the impact element 40I, and with the continued application of force to the workpiece W, the hammer head 40 will be again pivoted back into the path of a striking element 26. Accordingly, with the rotation of the next successive hammer striking element 26 into engagement with the impact element 40I, the hammer will again be driven into a hammering relationship with the T-edging strip T for driving it into the workpiece W. This operation continues as long as the workpiece W is used to apply a force against the hammer head 40 for maintaining it in an operative relationship with the actuating structure. With the release of the force from the workpiece W, the hammer 40 will assume its normal relationship with the actuating structure and no hammering action is produced.

What is claimed is:

1. A hammer comprising a substantially semicircular flapper element pivotable about a point adjacent one end thereof and swingable about the pivot point upon receiving an impacting force at a preselected location thereof to thereby swingably produce a hammering action on a workpiece, the flapper element having a partial cylindrical configuration and is arranged in a vertical orientation, said flapper element including a long-wearing impact area defined on the inside cylindrical surface thereof at a preselected location for receiving the impacts from said impacting means, and means for continuously producing an intermittent impacting force on the flapper element at said preselected location upon the flapper element being moved into engagement therewith and only during the time intervals the flapper element is maintained in engagement with said means at said preselected location, said impacting means comprising three hammer impacting elements arranged in a triangular relationship for successively impacting the hammer at the impact area.

2. A hammer as defined in claim 1 including cover means having sound absorbing means for rendering the thus defined hammer relatively noise free.

3. A hammer as defined in claim 1 wherein the hammer striking area of the flapper element is constructed of a hard elastomeric material exhibiting a memory upon being successively impacted.

4. A substantially noise-free hammer for use in apparatus for securing preselected edging material to a workpiece comprising a rotary actuating structure adapted to be rotated at a preselected speed, the actuating structure including a plurality of spaced apart hammer actuating members mounted on the actuating structure to be rotatable therewith, and a substantially arcuate hammer head of a substantially semicircular cross-sectional configuration pivotally mounted in a spaced relationship with and adjacent one end of the rotary actuating structure for swinging movement towards and away from the rotary actuating structure, the hammer head having a hard, yet resilient low noise producing hammer striking area secured to the actuating structure side of the hammer head for striking engagement with the hammer actuating members, the hammer head being pivotably responsive to a force exerted through a workpiece on its outer hammering surface to move said resilient striking area into successive engagement with the hammer actuating members as they are successively rotated thereby for causing the hammer head to be successively pivoted against the workpiece and thereby continuously hammer the workpiece during the time intervals the workpiece is in engagement therewith.

5. A substantially noise-free hammer for use in apparatus for securing preselected edging material to a workpiece as defined in claim 4 wherein the arcuate hammer has an elastomeric member secured thereto for defining the hammer striking area.

6. A substantially noise-free hammer for use in apparatus for securing preselected edging material to a workpiece as defined in claim 4 wherein the rotary actuating structure includes a cover member having a sound insulating material secured to the inside of the cover member.

7. A substantially noise-free hammer for use in apparatus for securing preselected edging material to a workpiece as defined in claim 4 wherein the rotary actuating structure comprises three hammer actuating members mounted thereon in a triangular relationship.

8. A substantially noise-free hammer for use in apparatus for securing preselected edging material to a workpiece as defined in claim 4 including bumper means mounted adjacent the rotary actuating structure for receiving the free end of the hammer for aligning it with respect to said actuating structure.

9. In apparatus for installing T-edging having a tongue and a crosspiece at a preformed slot in the peripheral edge of a workpiece comprising a rotary shaft, a pair of spaced apart plates securing a plurality of spaced apart hammer striking elements therebetween and secured to the shaft for rotation therewith, the hammer striking elements being arranged to extend a preselected distance outwardly of the securing plates, said pair of securing plates are coaxially mounted circular plates and the hammer striking elements are cylindrical elements secured adjacent the peripheral edges of the circular plates, means for driving the shaft, a hammer head pivotally mounted adjacent said securing plates and normally arranged in a spaced relationship therewith, the hammer head is of a substantially semicircular cylindrical configuration and is pivotally mounted adjacent one end in an upright position, the hammer head being movable toward the securing plates for receiving successive glancing strikes from the hammer striking elements as they are rotated thereby for successively rebounding therefrom to thereby hammer a workpiece maintaining the hammer head in the path of the hammer striking elements.

10. In apparatus for installing T-edging having a tongue and crosspiece at a preformed slot in the peripheral edge of a workpiece as defined in claim 9 including bumper means mounted adjacent the free end of the hammer head for receiving and guiding same.

11. In apparatus for installing T-edging having a tongue and crosspiece at a preformed slot in the peripheral edge of a workpiece as defined in claim 10 including a wear element mounted intermediate the bumper means and the circular plates for slidably receiving the free end of the hammer head.

12. In apparatus for installing T-edging having a tongue and crosspiece at a preformed slot in the peripheral edge of a workpiece as defined in claim 9 wherein the hammer head includes a resilient yet hard hammering surface for solely engaging the hammer striking elements.

13. In apparatus for installing T-edging having a tongue and crosspiece as a preformed slot in the peripheral edge of a workpiece as defined in claim 12 wherein the hammering surface comprises an elastomer bumper secured at a preselected location on the hammer head.

14. In apparatus for installing T-edging having a tongue and crosspiece at a preformed slot in the peripheral edge of a workpiece as defined in claim 13 including cover means secured over the circular plates and enclosing same.

15. In apparatus for installing T-edging having a tongue and crosspiece at a preformed slot in the peripheral edge of a workpiece as defined in claim 14 wherein said cover means enclosing the opposite side of the circular plates from the side enclosed by the hammer head and said cover means includes sound absorbing means.

16. In apparatus for installing T-edging having a tongue and crosspiece at a preformed slot in the peripheral edge of a workpiece as defined in claim 15 including means for guiding a strip of T-edging into engagement with the hammer head.

17. In apparatus for installing T-edging having a tongue and crosspiece at a preformed slot in the peripheral edge of a workpiece as defined in claim 9 wherein there are three hammer striking elements arranged in a triangular relationship with the securing plates.

* * * * *